US006522295B2

(12) United States Patent
Baugh et al.

(10) Patent No.: US 6,522,295 B2
(45) Date of Patent: Feb. 18, 2003

(54) PASSIVE COHERENT LOCATION SYSTEM AND METHOD

(75) Inventors: Kevin W. Baugh, Gaithersburg, MD (US); Richard Lodwig, Gaithersburg, MD (US); Robert Benner, Gaithersburg, MD (US)

(73) Assignee: Lockheed Martin Mission Systems, Gaithersburg, MD (US)

( * ) Notice: Subject to any disclaimer, the term of this patent is extended or adjusted under 35 U.S.C. 154(b) by 0 days.

(21) Appl. No.: 09/840,309

(22) Filed: Apr. 24, 2001

(65) Prior Publication Data

US 2002/0005803 A1 Jan. 17, 2002

Related U.S. Application Data

(60) Provisional application No. 60/199,210, filed on Apr. 24, 2000.

(51) Int. Cl.$^7$ ................................. G01S 3/02
(52) U.S. Cl. ......................................... 342/453
(58) Field of Search .......................... 342/453

(56) References Cited

U.S. PATENT DOCUMENTS

| | | | |
|---|---|---|---|
| 3,242,487 A | 3/1966 | Hammack | 343/7 |
| 3,270,340 A | 8/1966 | Hammack | 343/7 |
| 3,286,263 A | 11/1966 | Hammack | 343/112 |

(List continued on next page.)

FOREIGN PATENT DOCUMENTS

| | | |
|---|---|---|
| DE | 38 18 813 C1 | 6/1999 |
| FR | 2 776 438 A | 9/1999 |

OTHER PUBLICATIONS

GPS Navigation Data, J.J. Spilker, in Global Positioning Sytstem: Theory and Applications, vol. I, Ed. B.W. Parkinson et al., American Institude of Aeronautics and Astronautics Inc., pp. 122, 1996.*
English Translation of FR 2,776,438 A1.*
Ogrodnik, Robert F.; Bistatic Laptop Radar: An Affordable, Silent Radar Alternative; Proceedings of the 1996 IEEE National Radar Conference; Ann Arbor, MI; May 13–16, 1996; pp. 369–373.
Poullin, D., Lesturgie, M.; Multistatic Radar Using Noncooperative Transmitters; International Conference on Radar, Proceedings of International Radar '94 Conference; Paris, Frances, May 3–6, 1994; pp. 370–375.
Howland, P. E.; A Passive Metric Radar Using a Transmitter of Opportunity; International Conference on Radar Proceedings of International Radar '94 Conference; Paris, France; May 3–6, 1994; pp. 251–256.
P.E. Howland; "Target tracking using television–based bistatic radar";IEE Proc.–Radar, Sonar Navig., vol. 146, No. 3, Jun. 1999; pp. 166–174.

(List continued on next page.)

*Primary Examiner*—Thomas H. Tarcza
*Assistant Examiner*—Fred H Mull
(74) *Attorney, Agent, or Firm*—Hogan & Hartson LLP

(57) ABSTRACT

A system and method for enhancing object state awareness is disclosed. The system includes a receiver subsystem that receives reference signals from an uncontrolled transmitter and scattered transmissions originating from the uncontrolled transmitter and scattered by an object. The system also includes a front-end processing subsystem that determines a radial velocity of the object based on the received transmissions. The system also includes a back-end processing subsystem that determines object state estimates based on the determined radial velocity.

22 Claims, 3 Drawing Sheets

U.S. PATENT DOCUMENTS

| | | | | |
|---|---|---|---|---|
| 3,573,611 | A | | 4/1971 | Bergemann et al. .......... 324/57 |
| 3,706,096 | A | | 12/1972 | Hammack ...................... 343/9 |
| 3,786,509 | A | | 1/1974 | Applebaum et al. ....... 342/17.1 |
| 3,795,911 | A | | 3/1974 | Hammack ...................... 343/9 |
| 3,972,000 | A | | 7/1976 | Desblache et al. .......... 329/105 |
| 4,114,153 | A | | 9/1978 | Neidell ........................... 343/9 |
| 4,270,150 | A | | 5/1981 | Diermann et al. ............ 360/10 |
| 4,271,412 | A | | 6/1981 | Glass et al. ................ 343/5 FT |
| 4,284,663 | A | | 8/1981 | Carruthers et al. .......... 427/164 |
| 4,314,376 | A | | 2/1982 | Williams .................... 455/212 |
| 4,451,858 | A | | 5/1984 | Johnson, Jr. ................. 360/32 |
| 4,492,990 | A | | 1/1985 | Johnson, Jr. ................. 360/32 |
| 4,654,696 | A | | 3/1987 | Dayton et al. ................ 358/11 |
| 4,727,373 | A | | 2/1988 | Hoover ......................... 342/25 |
| 4,746,924 | A | * | 5/1988 | Lightfoot .................... 342/159 |
| 4,837,574 | A | | 6/1989 | Hill .............................. 342/27 |
| 4,888,641 | A | | 12/1989 | Isnardi et al. ............... 358/141 |
| 4,994,809 | A | | 2/1991 | Yung et al. .................. 342/108 |
| 5,043,805 | A | | 8/1991 | Citta et al. ..................... 358/83 |
| 5,127,021 | A | | 6/1992 | Schreiber ........................ 375/1 |
| 5,136,380 | A | | 8/1992 | Cho ............................. 358/141 |
| 5,173,704 | A | | 12/1992 | Buehler et al. ............... 342/26 |
| 5,192,955 | A | | 3/1993 | Hoang .......................... 342/80 |
| 5,214,501 | A | | 5/1993 | Cavallerano et al. ......... 358/12 |
| 5,252,980 | A | | 10/1993 | Gray et al. .................... 342/59 |
| 5,253,243 | A | | 10/1993 | Suzuki ......................... 369/48 |
| 5,285,470 | A | | 2/1994 | Schreiber ........................ 375/1 |
| 5,289,277 | A | | 2/1994 | Blanchard et al. .......... 348/441 |
| 5,315,445 | A | | 5/1994 | Fukumoto et al. ......... 360/19.1 |
| 5,337,085 | A | | 8/1994 | Lee et al. .................... 348/398 |
| 5,381,156 | A | | 1/1995 | Bock et al. ................. 342/126 |
| 5,434,570 | A | | 7/1995 | Wurman ...................... 342/26 |
| 5,451,960 | A | | 9/1995 | Kastella et al. ............... 342/59 |
| 5,452,015 | A | | 9/1995 | Hulyalkar ................... 348/608 |
| 5,525,995 | A | | 6/1996 | Benner ......................... 342/90 |
| 5,604,503 | A | | 2/1997 | Fowler et al. .............. 342/378 |
| 5,623,267 | A | | 4/1997 | Wurman ...................... 342/26 |
| 5,742,591 | A | | 4/1998 | Himayat et al. ............ 370/286 |
| 5,793,223 | A | | 8/1998 | Frankeny .................... 326/30 |
| 5,892,879 | A | | 4/1999 | Oshima ........................ 386/46 |
| 5,912,640 | A | | 6/1999 | Bradford et al. ............... 342/99 |
| 5,924,980 | A | | 7/1999 | Coetzee ...................... 600/300 |
| 5,943,170 | A | | 8/1999 | Inbar et al. .................. 359/561 |
| 5,946,238 | A | | 8/1999 | Campardo et al. ....... 365/185.2 |
| 5,990,831 | A | | 11/1999 | McDowell .................. 342/378 |
| 6,002,347 | A | | 12/1999 | Daly et al. ................... 340/963 |
| 6,029,558 | A | | 2/2000 | Stevens et al. ............ 89/36.17 |
| 6,031,485 | A | | 2/2000 | Cellai et al. ................. 342/131 |
| 6,031,879 | A | | 2/2000 | Pace et al. ................... 375/316 |
| 6,038,201 | A | | 3/2000 | Kim .............................. 369/48 |
| 6,052,421 | A | | 4/2000 | Richardson et al. ......... 375/346 |
| 6,057,877 | A | | 5/2000 | Limberg ....................... 348/21 |
| 6,133,873 | A | | 10/2000 | Krasner .................. 342/357.12 |
| 6,135,952 | A | | 10/2000 | Coetzee ...................... 600/336 |
| 6,167,132 | A | | 12/2000 | Krone et al. ................. 379/399 |
| 6,167,134 | A | | 12/2000 | Scott et al. .................. 379/413 |
| 6,222,922 | B1 | | 4/2001 | Scott et al. .................. 379/377 |
| 6,232,922 | B1 | * | 5/2001 | McIntosh ............... 342/357.06 |
| 2001/0009405 | A1 | * | 7/2001 | Chang et al. .......... 342/357.01 |

OTHER PUBLICATIONS

J. M. Holt, P. J. Erickson, A. M. Gorezyca, T. Grydeland; MIDAS–W: a workstation–based incoherent scatter radar data acquisition system; Annales Geophysicae; Jun. 21, 2000; pp. 1231–1241.

David R. Martinez; Application of Parallel Processors to Real–Time Sensor Array Processing; MIT Lincoln Laboratory; pp. 1–7.

Wu Jianqi, He Ruilong and Jiang Kai; Researches of A New Kind of Advanced Metric Wave Radar; I.E.E.E.; Jun. 1999: pp. 194–197.

Roger W. Schwenke; Sensitivity Analysis Of An Estimator–Correlator For The Detection Of Spread Targets With Multiple Discrete Highlights; The Pennsylvania State University Graduate School; Dec. 2000; pp. 1–13.

* cited by examiner

PASSIVE COHERENT LOCATION SYSTEM AND METHOD

CROSS REFERENCE TO RELATED APPLICATIONS

This application claims benefit of U.S. Provisional Patent Application No. 60/199,210 entitled PASSIVE COHERENT LOCATION METHOD AND SYSTEM, filed Apr. 24, 2000 which is hereby incorporated by reference.

BACKGROUND OF THE INVENTION

1. Field of the Invention

The present invention relates to a passive coherent location (PCL) system and method, and more particularly to a PCL system and method for use in moving target surveillance sensors.

2. Description of Related Art

A number of conventional radar systems have particularly high life-cycle costs due to the initial cost of the radar system and the maintenance cost of the radar system. Furthermore, because conventional radar systems typically broadcast electromagnetic signals, a regulated activity, extensive regulatory procurement and compliance costs are associated with operating current radar systems.

Additionally, extensive physical, regulatory, and economic disincentives prevent transporting such systems on a temporary or mobile basis. For example, transporting a current radar system to a special event such as the Olympics, a fireworks display, a construction site, a residence, and the like would pose numerous disincentives, including the assessment of environmental impact proper licensing from various regulatory agencies and the costs associated with moving the electromagnetic signal transmitter.

SUMMARY OF THE INVENTION

Accordingly, the present invention is directed to a PCL system and method that substantially obviates one or more of the problems due to limitations and disadvantages of the related art.

An object of the present invention is to provide a PCL system that provides enhanced airspace awareness around a predetermined location for lower total life cycle cost than the related art.

An object of the present invention is to provide a PCL system that provides enhanced airspace awareness around a predetermined location using ambient transmissions from at least one uncontrolled transmitter.

An object of the present invention is to provide a PCL system that provides enhanced airspace awareness around a predetermined location based primarily upon frequency change of arrival information derived from ambient transmissions from at least one uncontrolled transmitter.

Another object of the present invention is to provide a PCL system that provides enhanced airspace awareness for a predetermined location, such as an airport, using ambient transmissions from at least one uncontrolled transmitter, wherein the initial position information is determined from frequency-difference-of-arrival, time-difference-of-arrival, and angle-of-arrival information from the ambient transmissions.

An object of the present invention is to provide a PCL system that provides enhanced airspace awareness around a predetermined location as well as enhanced ground-traffic awareness within the predetermined location using ambient transmissions from at least one uncontrolled transmitter.

Another object of the present invention is to provide a mobile radar system that provides enhanced airspace awareness during a predetermined event using ambient transmissions from at least one uncontrolled transmitter.

Yet another object of the present invention is to provide a system and method for selecting a subset of ambient transmission signals from a plurality of ambient transmission signals based on a set of predetermined criteria.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

In one embodiment, a PCL system receives transmissions from a plurality of uncontrolled transmitters. In a preferred embodiment, the uncontrolled transmitters may include radio and television broadcast stations. Additionally, the PCL system may use signals from transmitters operated by operationally independent entities. The signals from uncontrolled transmitters may be used independently or in conjunction with signals from transmitters operated by the organization controlling the PCL system.

In one embodiment, a PCL system includes an antenna subsystem, a coherent receiver subsystem, a front-end processing subsystem, a back-end processing subsystem, and an output device. Each of these subsystems is connected by a communication link, which may be a system bus, a network connection, a wireless network connection, or other type of communication link.

In one embodiment, the present invention is used to monitor the airspace of a predetermined location using ambient transmissions from at least one uncontrolled transmitter. In a preferred embodiment, ambient transmissions are scattered by an object and received by a PCL system. These scattered transmissions are compared with a reference transmission that is received directly from the uncontrolled transmitter to the PCL system. In particular, the frequency-difference-of-arrival between the scattered transmission and the reference transmission is determined, which allows the radial velocity of the object to be determined. The present invention may be used in conjunction with or in lieu of a conventional radar system.

In one embodiment, the present invention is used to monitor the airspace of a predetermined location using ambient transmissions from at least one uncontrolled transmitter and using initial position information relating to an object approaching the predetermined location. This initial position information may include an electronic or verbal communication of the object's position at a predetermined time. For example, a plane approaching an airport may provide the system with its position, thereby allowing the system to quickly establish an accurate track for the plane.

In another embodiment, the present invention is used to provide enhanced airspace awareness around a predetermined location as well as enhanced ground-traffic awareness within the predetermined location using ambient transmissions from at least one uncontrolled transmitter.

In another embodiment, the present invention is used to enable a mobile radar system that provides enhanced airspace awareness during a predetermined event using ambient transmissions from at least one uncontrolled transmitter. In a preferred embodiment, the present invention is used as part of a monitoring system in which a vehicle is deployed to a predetermined location to receive ambient transmissions from at least one uncontrolled transmitter.

In yet another embodiment, the present invention is used to select a subset of ambient transmission signals from a plurality of ambient transmission signals based on a set of predetermined criteria.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
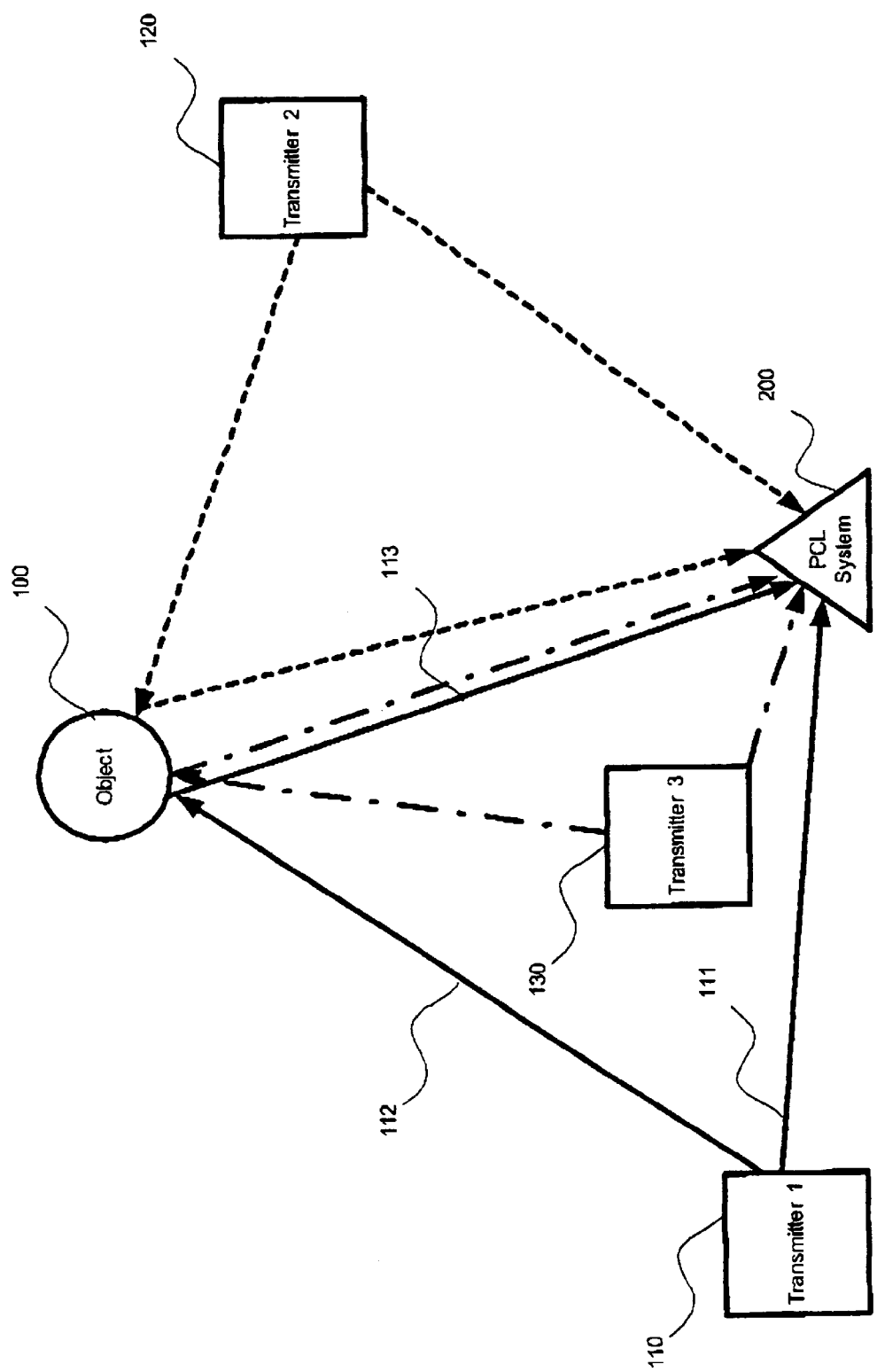
FIG. 1 shows a diagram of a plurality of transmitters, an object, and a system in accordance with the present invention.

Reference will now be made in detail to the preferred embodiment of the present invention, examples of which are illustrated in the drawings.

FIG. 1 shows a diagram of a plurality of transmitters, an object, and a system in accordance with the present invention. In a preferred embodiment, a PCL system 200 receives transmissions from a plurality of uncontrolled transmitters 110, 120, and 130. In a preferred embodiment, the uncontrolled transmitters 110, 120, and 130 may include radio and television broadcast stations, national weather service transmitters, radionavigational beacons (e.g., VOR), and transmitters supporting current and planned services and operations (e.g., automatic dependant surveillance-broadcast), any of which may or may not be under the operational control of the entity controlling PCL system 200. Additionally, PCL system 200 may use signals from transmitters operated by operationally independent entities. Additional transmitters (not shown) may be present and useable by a particular PCL system 200, which may have a system and method for determining which subset of possible ambient signals to use, as disclosed in greater detail below.

In one embodiment, transmitters 110, 120, and 130 are not under the control of the entity controlling PCL system 200. In a preferred embodiment, transmitters 110, 120, and 130 are radio and television broadcast stations and PCL system 200 is controlled by a separate entity. The signals from uncontrolled transmitters may be used independently or in conjunction with signals from transmitters operated by the separate entity.

Turning to the operation of the present invention, transmitters 110, 120, and 130 transmit low-bandwidth, electromagnetic transmissions in all directions. Exemplary ambient transmissions are represented in FIG. 1, including ambient transmissions 111 and 112. Some of these ambient transmissions are scattered by object 100 and received by PCL system 200. For example, ambient transmission 112 is scattered by object 100, and scattered transmission 113 is received by PCL system 200. Additionally, reference transmission 111 is received directly by PCL system 200. Reference transmission 111 may be an order of magnitude greater than scattered transmission 113. PCL system 200 compares reference transmission 111 and scattered transmission 113 to determine positional information about object 100. For purposes of this application, positional information includes any information relating to a position of object 100, including three-dimensional geographic state (hereinafter geographic state), change of geographic state (i.e., velocity), and change of velocity (i.e., acceleration).

In particular, the system determines the frequency-difference-of-arrival between the scattered transmission and the reference transmission, which in turn allows the velocity of the object to be determined. The present invention may rely on such uncontrolled transmitters as low-bandwidth transmitters, which as will be understood yield relatively poor time-delay resolution and relatively good frequency-difference resolution. This frequency-difference resolution, however, does not provide geographic state information directly, but velocity information which can be used to derive geographic state information in accordance with the present invention. Accordingly, the preferred embodiment of the present invention relies primarily upon frequency-difference-of-arrival information to determine an object's geographic state.

In one embodiment, the present invention uses reference transmissions and scattered transmissions from multiple transmitters 110, 120, and 130 to more quickly and more reliably resolve the geographic state of object 100. Furthermore, in one embodiment, the system may receive and/or maintain initialization information, as disclosed in greater detail below.

Figure 2:
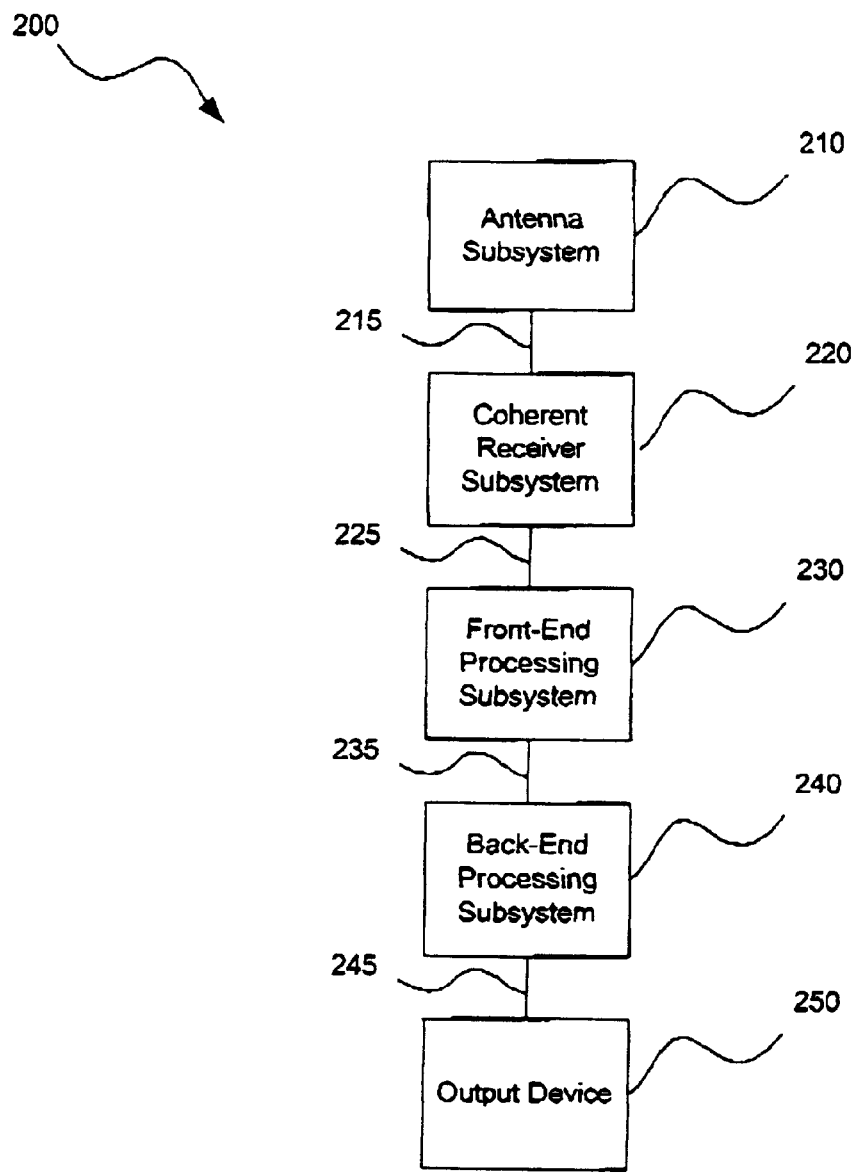
FIG. 2 shows a block diagram of an embodiment of the present invention.

FIG. 2 shows a logical block diagram of an embodiment of the present invention. PCL system 200 includes antenna subsystem 210, coherent receiver subsystem 220, front-end processing subsystem 230, back-end processing subsystem 240, and output device 250. Each of these subsystems may be connected by a communication link 215, 225, 235, and 245, which may be a system bus, a network connection, a wireless network connection, or other type of communication link. In a preferred embodiment, there are no moving components within the radar system. Select components are described in greater detail below.

Antenna subsystem 210 receives electromagnetic transmissions, including scattered transmission 113 and reference transmission 111. Preferably antenna subsystem 210 includes a structure to allow the detection of the direction from which the scattered transmission arrives, such as a phased array which measures angle-of-arrival of scattered transmission 113. Preferably, antenna subsystem 210 covers a broad frequency range.

Coherent receiver subsystem 220 receives the output of antenna subsystem 210 via antenna-to-receiver link 215. In one embodiment, coherent receiver subsystem 220 comprises an ultrahigh dynamic range receiver. In a preferred embodiment, the dynamic range of the coherent receiver is in excess of 120 dB instantaneous dynamic range. Coherent receiver subsystem 220 may be tuned to receive transmissions of a particular frequency plus or minus a predetermined variance based on the anticipated Doppler shift of the scattered transmission. For example, receiver subsystem 220 may be tuned to receive transmissions having a frequency of transmitter 110 plus or minus an anticipated Doppler shift. Coherent receiver subsystem 220 preferably outputs digitized replicas of scattered transmission 113 and reference transmission 111.

In one embodiment, front-end processing subsystem 230 comprises a high-speed processor configured to receive the digitized transmission replicas and determine the frequency-difference-of-arrival. Conventional hardware may include SGI™ Origin™ 2000 from Silicon Graphics, Inc. In another embodiment, front-end processing subsystem 230 comprises a special purpose hardware devices, a large scale integrated circuits, or an application-specific integrated circuit. In addition to determining the frequency-difference-of-arrival, front-end processing subsystem 230 may determine the time-difference-of-arrival and the angle-of-arrival of the digitized transmissions. Appropriate algorithms could be considered for these calculations.

Back-end processing subsystem 240 comprises a high-speed general processor, such as a Silicon Graphics Onyx® visualization supercomputer from Silicon Graphics, Inc., configured to receive the output of the front-end processing subsystem 230 and to determine positional information, particularly geographic state, for object 100. For a detailed description of a system and method for determining geographic state for an object based on frequency-difference-of-arrival measurements, refer to U.S. Pat. No. 5,525,995 entitled DOPPLER DETECTION SYSTEM FOR DETERMINING INITIAL POSITION OF A MANEUVERING TARGET issued Jun. 11, 1996, assigned to Loral Federal Systems Company, incorporated herein by reference.

Communication between front-end processing subsystem 230 and back-end processing subsystem 240 may be implemented by processor communication link 235. In a preferred embodiment, processor communication link 235 is implemented using a commercial TCP/IP local area network. In another embodiment, processor communication link 235 may be implemented using a high speed network connection, a wireless connection, or another type of connection that allows front-end processing subsystem 230 and back-end processing subsystem 240 to be remotely located relative to one another. In one embodiment, front-end processing system may compress digitized transmission replicas to decrease traffic across processor communication link 235 despite the associated cost in loss of data or additional processing requirements.

In another embodiment, data may be transmitted across processor communication link 235 only upon the occurrence of a predetermined event, such as a user request. For example, the present invention may be used to acquire and temporarily buffer digitized transmission replicas by front-end processing subsystem 230. Over time, older digitized transmission replicas may be overwritten by newer digitized transmission replicas if no request is made by a user. However, upon request, buffered digitized transmission replicas may be transmitted for analysis to back-end processing subsystem 240. This aspect of the present invention may be used to reconstruct an aircraft accident situation, for example.

Although it is possible to implement the present invention on a single processing unit, in a preferred embodiment, back-end processing subsystem 240 and front-end processing subsystem 230 are implemented using two independent general or special purpose processors in order to increase modularity and to enable specialized processing hardware and software to be implemented for the logically discrete tasks performed by each of these subsystems. For example, having the processors separate allows enhanced system robustness and increase ease of installation.

Output device 250 may comprise a computer monitor, a datalink and display, a network connection, a printer or other output device. Output device 250 may additionally provide information relating to an accuracy estimate of the geographic state information as determined by back-end processing subsystem 240. Output device communication link may comprise a high-speed bus, a network connection, a wireless connection, or other type of communication link.

Figure 3:
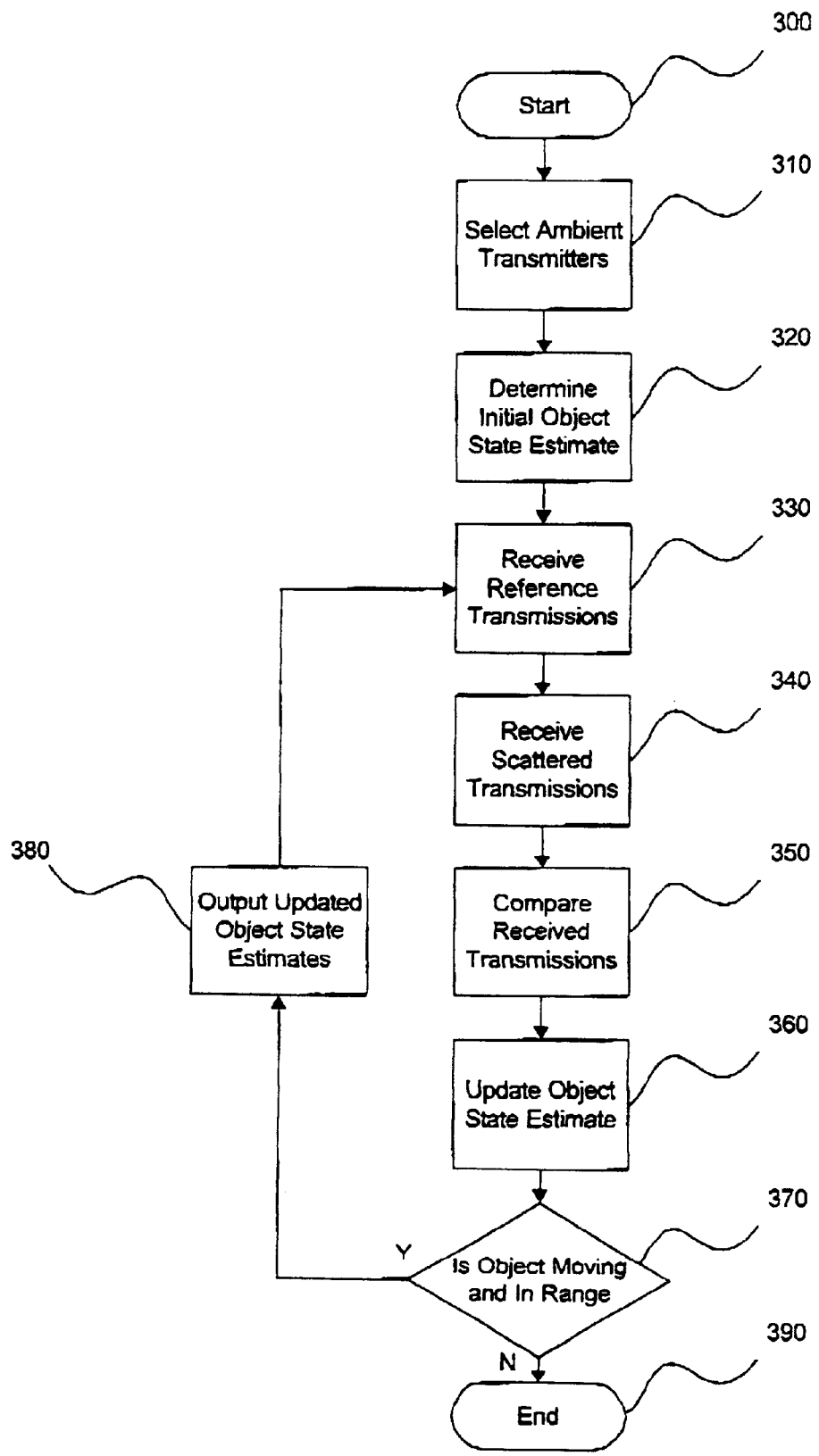
FIG. 3 shows a flow chart of a system in accordance with the present invention.

FIG. 3 shows a flow chart of a method for determining an updated state estimate for an object in accordance with the present invention. By way of overview, at step 300, the process of determining an object's geographic position in accordance with the present invention is initiated. At step 310, the system selects a subset of uncontrolled transmitters from a plurality of possible uncontrolled transmitters. At steps 330 and 340, scattered and reference transmissions are received from at least one uncontrolled transmitter. At step 350, scattered and reference transmissions are compared. At step 352, the system determines whether the object is new. If the object is determined to be new, the system determines the initial object state estimation at step 354 using frequency-difference-of-arrival, time-difference-of-arrival, and angle-of-arrival information determined from the received transmissions. If the object is not new, the system proceeds to step 360 and updates the object state estimate based primarily on frequency-difference-of-arrival information. At step 370, the system determines whether the object is moving and within range. If the object is moving and is within the range of the system, the system outputs the object state estimates at step 380, and returns to step 330. If the object is not moving or is out of range at step 370, the process is terminated. Each of these steps is described in greater detail below.

At step 310, the system selects a subset of uncontrolled transmitters. The step may comprise selecting a subset of uncontrolled transmitters from a plurality of uncontrolled transmitters based on a set of predetermined criteria. Such criteria may include the spatial separation and signal strength of the individual transmitters, whether there is a clear line of site between the transmitter and the PCL system, the frequency characteristics of the transmitter, interference from other sources including transmitters, and other criteria. Other criteria may be used. The selection of transmitters may be done in advance or may be performed dynamically and updated periodically based on current transmission signals. Alternately, because most of the information needed to select transmitters is public record, recommended transmitters for a particular location may be predetermined.

Once the transmitters are identified, the PCL system receives reference transmissions from the transmitter at step 330. At step 340, the PCL system receives scattered transmissions that originated from the transmitter and were scattered by the object in the direction of the receiver. At step 350, the scattered and reference transmissions are compared to determine the frequency-difference-of-arrival and the time-difference-of-arrival, and the angle of arrival of the scattered signal is determined using a phased array. Appropriate techniques for determining the frequency-difference-of-arrival and the time-difference-of-arrival include standard cross-correlation techniques.

At step 352, the system determines whether the compared signals correlate to a new object or an object that has previously been identified by the system. If the object is determined to be new, the system determines an initial object state estimate at step 354. In a preferred embodiment, initial object state information may be determined from the frequency-difference-of-arrival and time-difference-of-arrival between scattered transmission 113 and reference transmission 111 as well as angle-of-arrival information for scattered transmission 113.

In another embodiment, the system may assume an initial object position. Additionally, the system may allow a user to input an initial object location. Furthermore, the object may have a positional device, such as a global positioning system, that may provide the data to the system electronically. A combination of the aforementioned methods and other methods of determining initial state information may be used. Once an initial state estimate is determined, the system proceeds to step 370.

If, at step 352, the system determines that the object is not a new object, the system proceeds to step 360. At step 360, the system updates the object's state estimate based primarily on the frequency-difference-of-arrival between scattered transmission 113 and reference transmission 111. In one embodiment, the system may update the object's state estimate based solely on the frequency-difference-of-arrival between scattered transmission 113 and reference transmission 111, without reference to time-difference-of-arrival and angle-of-arrival information. In one embodiment, this information is stored in memory for subsequent use.

The frequency-difference-of-arrival information and other transmission and transmission comparison information may be used in conjunction with the initial object state estimation to determine an updated object state estimate. If transmissions are being processed from a plurality of transmitters for a single object, the system may determine an updated object state estimate by determining a location in three-dimensional space from which the object could cause each of the determined frequency shifts. Based on the signal strength, the accuracy of the initial object state estimation, the processing speed of the system and other factors, the system may be able to resolve the object to a point or area in three-dimensional space. Additionally, the system may determine an accuracy rating associated with the updated object state estimate based on these and other factors. Once the system has updated the object state estimate, it proceeds to step 370.

At step 370, the system determines whether the object is moving and within range of the system. If the object is moving, the system proceeds to step 380 and outputs the object state information. This output may be provided to a CRT display associated with the system, a network connection, a wireless network connection, a cockpit datalink and display, or other output device. In one embodiment, the system may output an accuracy rating for the object state estimate.

After the object's state estimate is output, the system returns to step 330 and reiterates steps 330 to 370 until the system determines that the object is no longer moving or is out of range of the system. Based on the high speed at which the system processes data and the relatively low speed at which the system may output data, the system may skip step 380 during one or more subsequent iterations. Once the system determines that the object is no longer moving, or determines that the object is out of range, the system proceeds to step 390 and the process terminates.

In another embodiment, the present invention may be used to enable a mobile radar system that provides enhanced airspace awareness during a predetermined event using ambient transmissions from at least one uncontrolled transmitter. In one embodiment, the present invention is used as part of a wheeled or tracked, vehicle-based monitoring system in which a vehicle is deployed to a predetermined location to receive ambient transmissions from at least one uncontrolled transmitter. This vehicle may be a non-commercial vehicle, such as a passenger van. This aspect of the present invention may be used to monitor an airspace for a special event such as the Olympics, a fireworks display, or other event.

In one embodiment, the present invention may be used to simultaneously track a plurality of objects. The system may use warnings to notify a controller, a pilot and/or a driver that an object is within a predetermined distance. Also, the system may use warnings to notify a controller, a pilot and/or a driver that one or more objects have a potentially unsafe course, such as a course that may cause a collision. Other warnings may also be used.

It will be apparent to those skilled in the art that various modifications and variations can be made in the present invention without departing from the spirit or scope of the invention. For example, although the present invention has been described with relation to a PCL system, it is possible to employ aspects of this invention with other types of radar systems including conventional monostatic radar systems. Thus, it is intended that the present invention cover the modifications and variations of this invention provided they come within the scope of the appended claims and their equivalents.

What is claimed is:

1. A system for enhancing object state awareness comprising:
    a receiver subsystem to receive a reference signal from an uncontrolled transmitter and scattered transmissions originating from the uncontrolled transmitter and scattered by an object;
    a front-end processing subsystem to determine a radial velocity of the object based on the received transmissions and to buffer digitized transmission replicas of the received transmissions; and
    a back-end processing subsystem to receive the digitized transmission replicas and to determine object state estimates based on the determined radial velocity.

2. The system of claim 1, wherein said scattered transmissions comprise ambient transmissions.

3. The system of claim 1, further comprising initial position information for said object, wherein said initial position information is communicated with said reference signal.

4. The system of claim 1, further comprising an output device to display said object state estimates.

5. The system of claim 1, further comprising a communication link to couple said receiver subsystem, said front-end processing subsystem and said back-end processing subsystem.

6. A passive coherent location system for monitoring a predetermined location, comprising:
    a receiver subsystem to receive scattered transmissions scattered by an object and to output digitized signals of said scattered transmissions, said scattered transmissions originating from an uncontrolled transmitter;
    a front-end processing subsystem to determine a frequency-difference-of-arrival for said digitized signals and to buffer digitized transmission replicas of said digitized signals; and
    a back-end processing subsystem to receive the digitized transmission replicas and to determine positional information for said object in accordance with said frequency-difference-of-arrival.

7. The system of claim 6, further comprising an output device to provide said positional information for said object.

8. The system of claim 6, further comprising a reference signal from said uncontrolled transmitter, said reference signal being used to determine said frequency-difference-of-arrival for said digitized signals.

9. The system of claim 6, wherein a velocity of said object is determined from said frequency-difference-of-arrival.

10. The system of claim 6, further comprising an antenna subsystem to detect said scattered transmissions.

11. The system of claim 10, wherein said antenna subsystem comprises a phased array antenna.

12. The system of claim 6, wherein said receiver subsystem comprises an ultrahigh dynamic range receiver.

13. The system of claim 6, further comprising a communication link between said front-end processing subsystem and said back-end processing subsystem.

14. A method for determining an updated state estimate for an object, comprising:

receiving a reference transmission from an uncontrolled transmitter, and a scattered transmission that originated from said uncontrolled transmitter and scattered by said object;

comparing said received transmissions to determine a frequency-difference-of-arrival;

updating a previous state estimate based on said determined frequency-difference-of-arrival; and buffering digitized transmission replicas of said received transmissions, wherein said digitized replicas are received by a back-end processing subsystem.

15. The method of claim 14, further comprising determining an initial state object estimate.

16. The method of claim 14, further comprising selecting said uncontrolled transmitter from a plurality of transmitters.

17. The method of claim 14, further comprising determining whether said object is moving.

18. The method of claim 14, further comprising outputting said updated state estimate.

19. The method of claim 14, further comprising terminating said receiving when said object is out-of-range.

20. The system of claim 1, wherein said reference signal is independent of a location for said uncontrolled transmitter.

21. The system of claim 6, wherein said scattered transmissions is independent of a location for said uncontrolled transmitter.

22. The method of claim 14, wherein said reference transmission is independent of a location for said uncontrolled transmitter.

\* \* \* \* \*